(12) United States Patent
Fukunaga et al.

(10) Patent No.: US 6,332,625 B1
(45) Date of Patent: Dec. 25, 2001

(54) STEERING SYSTEM FOR A MOTORCYCLE

(75) Inventors: Hirofumi Fukunaga; Mitsuru Yokoyama, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/539,384

(22) Filed: Mar. 31, 2000

(30) Foreign Application Priority Data

Mar. 31, 1999 (JP) .................................................. 11-093421

(51) Int. Cl.⁷ ........................... B62M 15/00; B62M 18/00
(52) U.S. Cl. ........................... 280/280; 280/279; 180/222
(58) Field of Search .................................. 280/275–277, 280/279, 280; 180/219–231

(56) References Cited

U.S. PATENT DOCUMENTS

| | | | | |
|---|---|---|---|---|
| 5,301,973 | * | 4/1994 | Truchinski | 280/280 |
| 5,967,538 | * | 10/1999 | Callaluca et al. | 280/280 |
| 6,155,370 | * | 12/2000 | Iwai et al. | 180/222 |
| 6,176,339 | * | 1/2001 | Reichardt | 280/280 |

* cited by examiner

Primary Examiner—Brian L. Johnson
Assistant Examiner—Matthew Luby

(57) ABSTRACT

A steering system of a motorcycle in which a top bridge is rotatably attached to a head pipe. An approximately flat plate handle bracket is attached to the top bridge through cushioning members. The flat plate handle bracket covers substantially the entire upper surface of the top bridge. Right and left handlebars are attached to the handlebar bracket.

10 Claims, 6 Drawing Sheets

STEERING SYSTEM FOR A MOTORCYCLE

BACKGROUND OF THE INVENTION

1. Field of the Invention

This invention relates to improvements in a steering system for a motorcycle.

2. Background Art

FIG. 7 is a schematic view of a conventional steering system for a motorcycle. In a steering system 100, a top bridge 102 is rotatably attached to a head pipe 101, and a handlebar 103 is attached to the top bridge 102 by handlebar holders 104 and a bolt 105. Numerals 106 refer to right and left front forks, and numerals 107 denote grips.

To improve the steering system 100 by enhancing the vibration-proof effect of the handlebar 103, which absorbs vehicle body vibration for the purpose of improved driving of a motorcycle, the use of a cushioning member in the steering system 100 has been proposed. The use of only the cushioning member in the conventional steering system, however, is not enough to obtain a vibration-proof effect. In addition, it is difficult to replace a conventional handlebar with an optional handlebar, which implements a cushioning member, because of a low degree of design freedom of conventional steering systems. Furthermore, since the cushioning member is visible from the driver's seat in the improved a conventional steering system as identified, the steering system still has room for improvement in appearance.

SUMMARY OF THE INVENTION

It is therefore an object of this invention to provide a steering system having a high vibration-proof effect, a high degree of design freedom, and which has improved appearance.

With a view to achieving the above-described object, a steering system for a vehicle is provided having a steering stem rotatably mounted on a frame portion of the vehicle, a bridge member mounted on a substantially distal end of the steering stem, a flat plate member attached to and over the bridge member, wherein the flat plate member covers substantially an upper surface area of the bridge member, and is attached to the bridge member via at least one bolt passed through at least one through hole in the flat plate member and through at least one passage in the bridge member, the at least one bolt being fixed in place by a nut threaded onto an end thereof, that at least one through passage having a cushioning member disposed therein.

The steering system has a high vibration-proof effect because the handlebar bracket is connected in a floating state to the top bridge, via the use of the cushioning member therebetween. The vibration-proof effect of the steering system can be further improved by using a relatively heavy handlebar bracket which applies an increased load to the cushioning member to thereby lower the natural frequency of the cushioning member. Because the right and left handlebars are attached to the handlebar bracket, it is possible to attach a conventional handlebar, and also it is simple replace the handlebar with an optional handlebar despite of the presence of the cushioning member. The cushioning member mounted to the top bridge is covered with the handlebar bracket and therefore is invisible to the driver.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
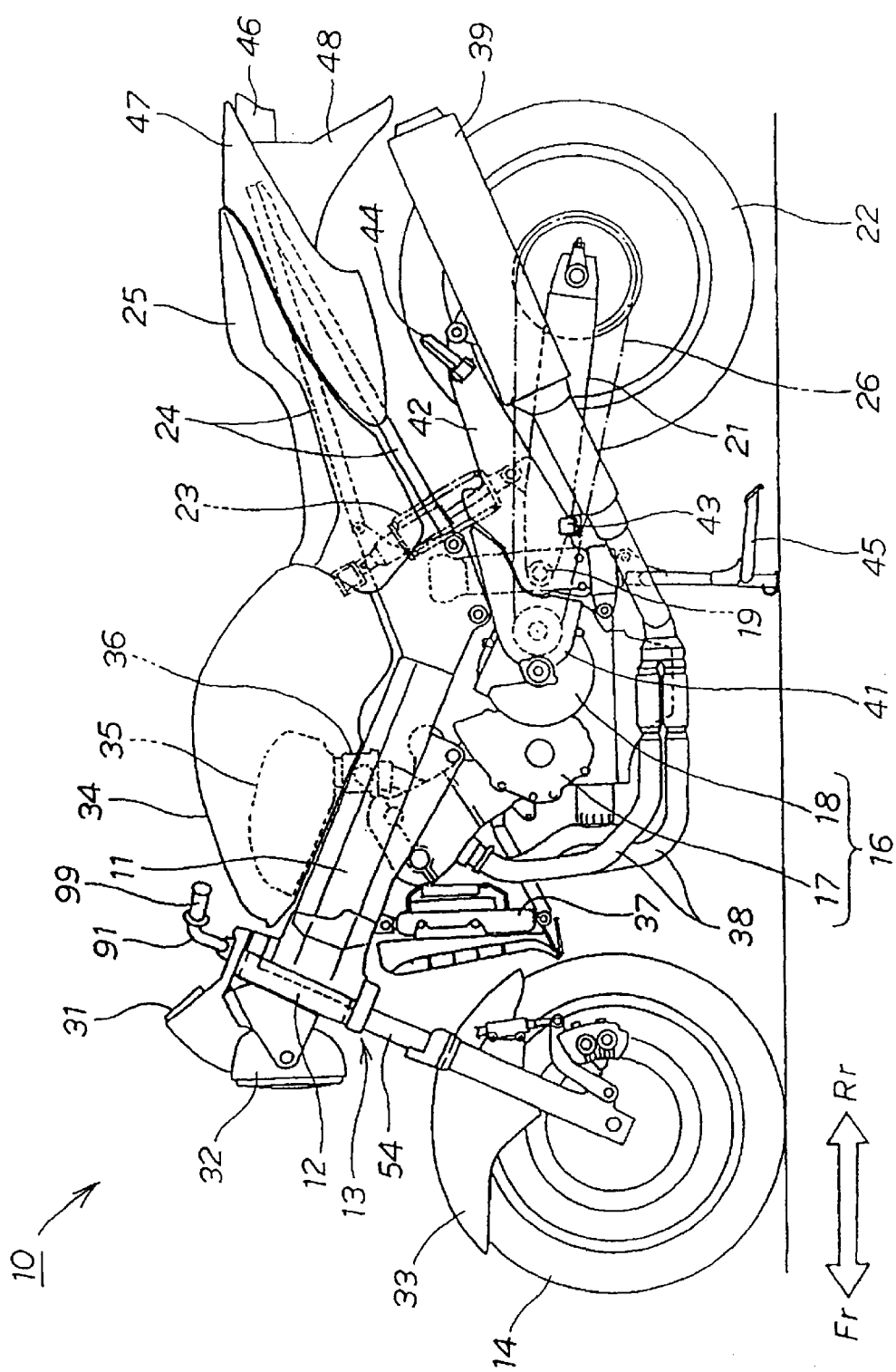
FIG. 1 is a left side view of a motorcycle according to an embodiment of the present invention.

Referring now to the accompanying drawings, the preferred embodiment of the vehicle frame of a motorcycle will be explained.

The "front", "rear", "left", "right", "upper" and "lower" designations used herein refer to orientations with respect to the driver; in the drawings, Fr denotes front side; Rr, rear side; L, left side; and R, right side. The drawings should be viewed in the direction of the reference numerals.

FIG. 1 is the left side view of a motorcycle of this invention. As seen in the Figure, the motorcycle 10 includes as components a vehicle frame 11, a steering system 13 attached to a head pipe 12 of the vehicle frame 11, a front wheel 14 attached to the lower part of the front fork 54 of the steering system 13, a power unit 16 (an assembly of an engine 17 at the front and a transmission 18 at the rear) mounted on the front lower part of the vehicle frame 11, a rear swing arm 21 attached to a swing arm pivot 19 provided on the rear lower part of the vehicle frame 11, a rear wheel 22 attached to a rear swing arm 21, a rear suspension 23 suspending the rear swing arm 21 at the rear upper part of the vehicle frame 11, and a seat 25 attached to the rear upper part of the vehicle frame 11 through a seat rail 24. The rear wheel 22 is driven by power generated by the power unit 16 through a drive chain 26.

The engine 17 is a water-cooled four-cylinder engine tilted forward and upward, the case of which serves also as the transmission case.

In the drawings, numeral 31 refers to an instrument cluster; 32, a headlight; 33, a front fender; 34, a fuel tank; 35, an air cleaner; 36, a carburetor; 37, a radiator; 38, an exhaust pipe; 39, a muffler; 41, a side cover; 42, a footrest bracket; 43, a driver footrest; 44, a pillion footrest; 45, a main stand; 46, a tail lamp; 47, a rear cover; 48, a rear fender; and 99, a handlebar grip.

Figure 2:
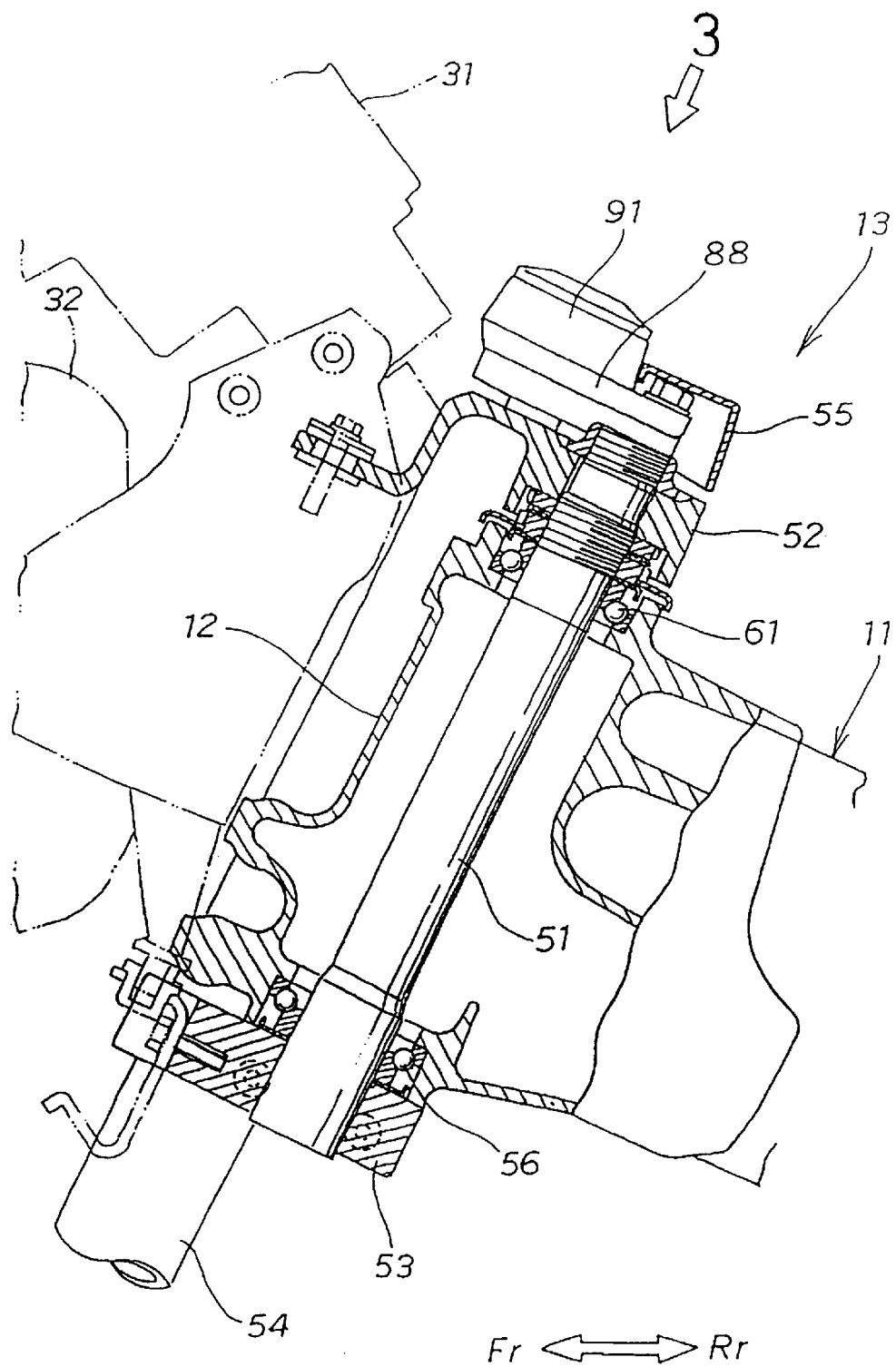
FIG. 2 is a side sectional view of a steering system according to an embodiment of the present invention.

FIG. 2 is a left side view showing the steering system of according to the embodiment of the present invention. As seen in the Figure, in the steering system 13, a vertical steering stem 51 is clockwise and counterclockwise rotatably mounted on the head pipe 12; a top bridge 52 is mounted on the upper part of a steering stem 51; a bottom bridge 53 is attached on the lower part of the steering stem 51; and a front fork 54 is attached at the upper end portion to the top and bottom bridges 52 and 53. On the head pipe 12, therefore, the top and bottom bridges 52 and 53 are rotatably mounted. The upper part of the top bridge 52 is covered with the handlebar cover 55. In the drawing, numeral 56 denotes a lower bearing.

Figure 3:
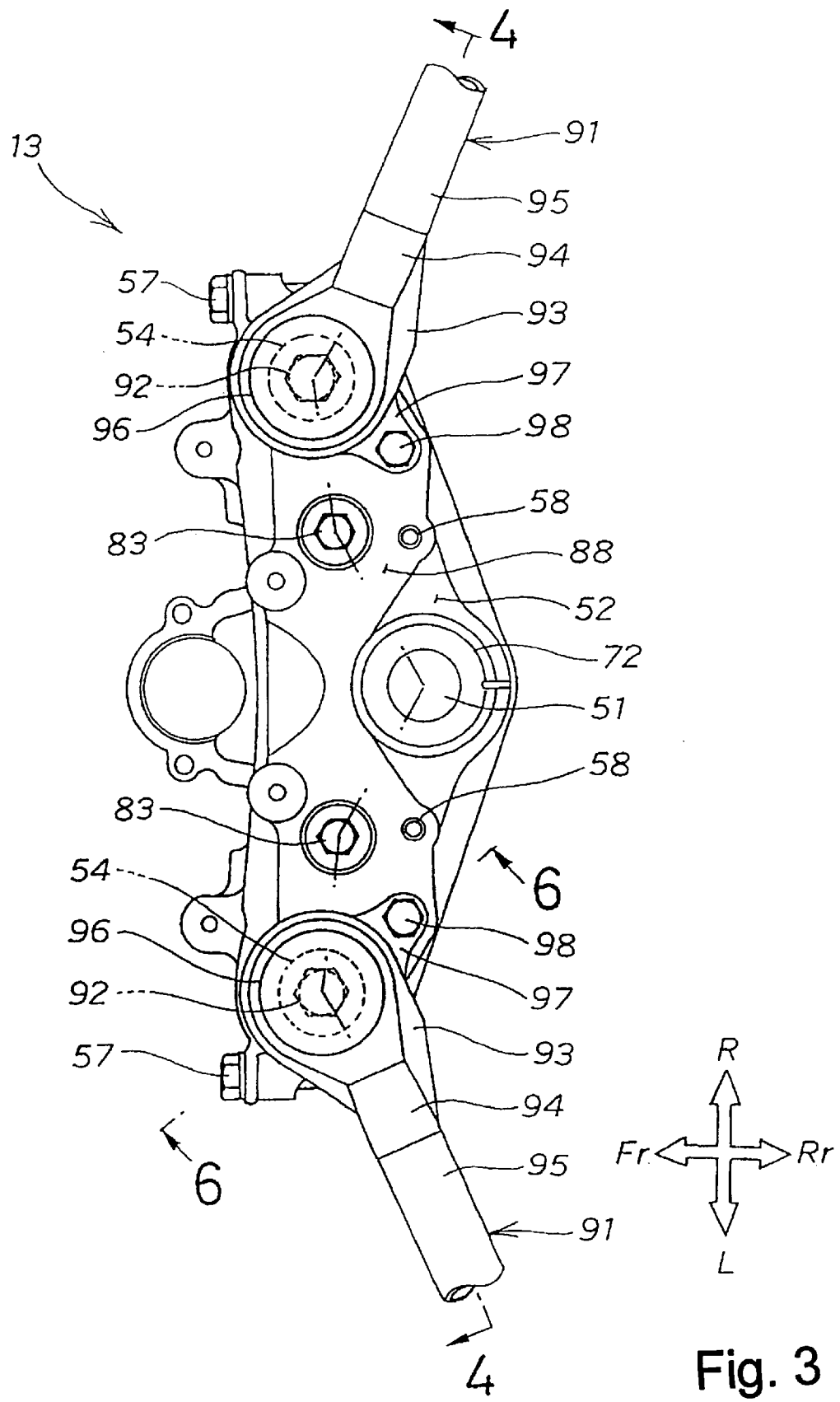
FIG. 3 is a view seen from the arrow 3 of FIG. 2.
Figure 4:
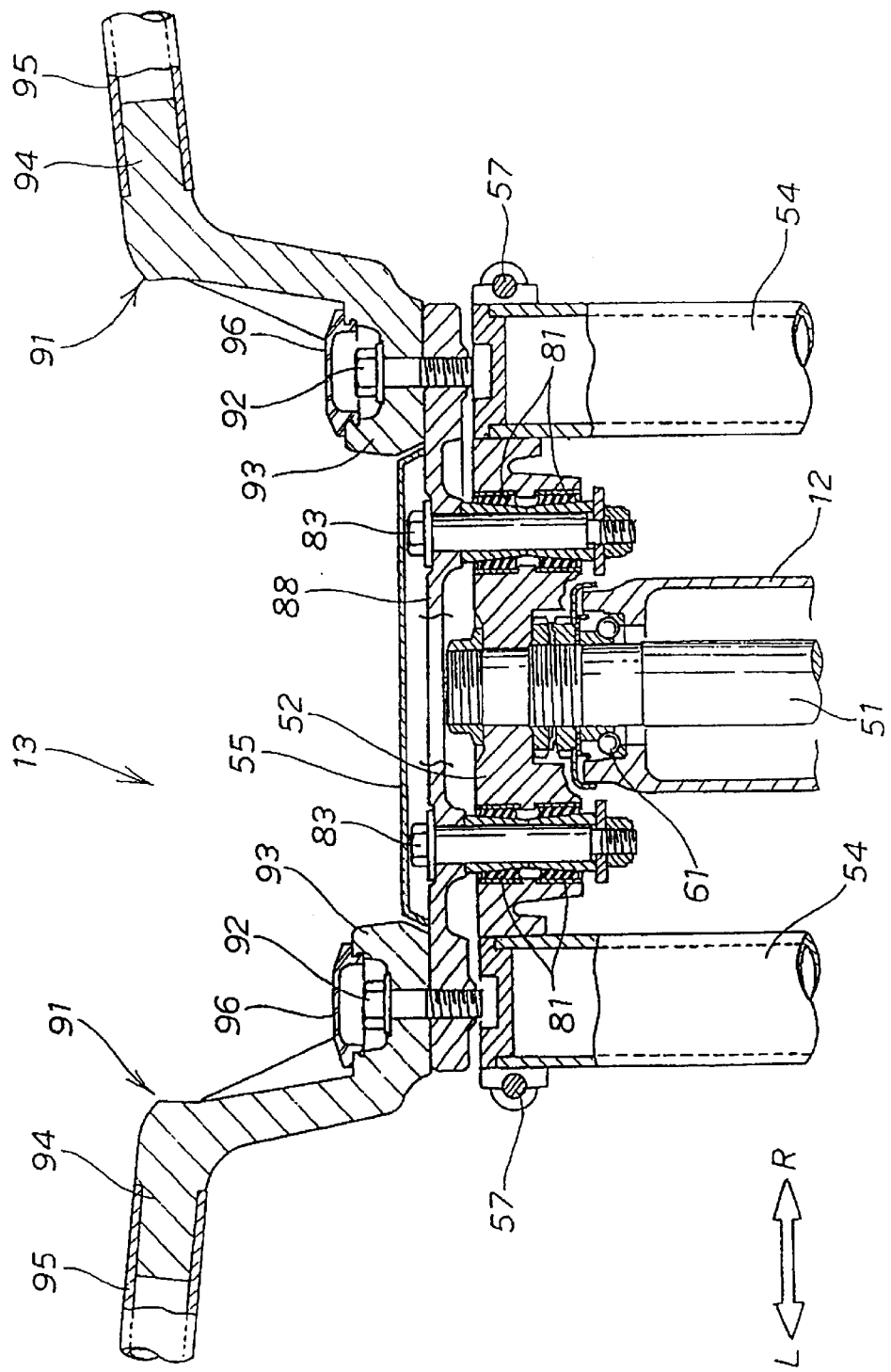
FIG. 4 is a sectional view taken along line 4—4 of FIG. 3.

FIG. 3 is a view seen from the arrow 3 of FIG. 2, showing in plan the structure of the steering system with the handlebar cover 55 removed. Later-described handlebars 91 are split having right and left halves. In the drawing, numerals 57 refer to top bridge mounting bolts, and numerals 58 denote handlebar cover attaching holes. FIG. 4 is a rear sectional view of the steering system 13 taken along line 4—4 of FIG. 3. The width of the steering system 13 shown in this drawing corresponds to the size as viewed from the rear.

The steering system 13 is characterized in that a handlebar bracket 88 is attached to the top bridge 52 through two right and two left cushioning members 81. Furthermore, the right and left handlebars 91 are attached to the handlebar bracket 88.

The handlebar bracket 88 is a single approximately flat plate-like member having relatively great rigidity, which is attached over the top bridge 52 with a slight clearance provided therebetween. The handlebar 91 is composed of handlebar bases 93 attached by a bolt 92 directly on the upper surface of the handlebar bracket 88, and a pipe-like handlebar portion 95 attached on the forward end portion 94 of the handlebar bases 93. The mounting positions of the handlebar bases 93, that is, the mounting positions of the right and left handlebars 91 are on the center of the right and left front forks 54. In the drawing, numerals 96 denote caps.

The positions of the right and left handlebars 91 are apart from the cushioning members 81, because the optimum positions of the cushioning members 81 and the optimum positions of the handlebars 91 are not necessarily the same at all times.

The right and left cushioning members 81 can freely be set in positions best suited for absorbing vehicle body vibration, taking the following three items into account: (1) the vibration characteristic of the motorcycle by each vehicle model, (2) the spring constant of the cushioning members 81, and (3) the material, size, rigidity, weight, etc. of the handlebar bracket 88.

On the other hand, the mounting positions of the right and left handlebars 91 can freely be set to the optimum positions in accordance with the type of the motorcycle, the model of the handlebar, appearance of the motorcycle, and the desired maneuverability of the handlebars 91.

Accordingly it is possible to separately set the positions of the cushioning members 81, and the mounting positions of the handlebars 91, which are mutually separated.

Figure 5:
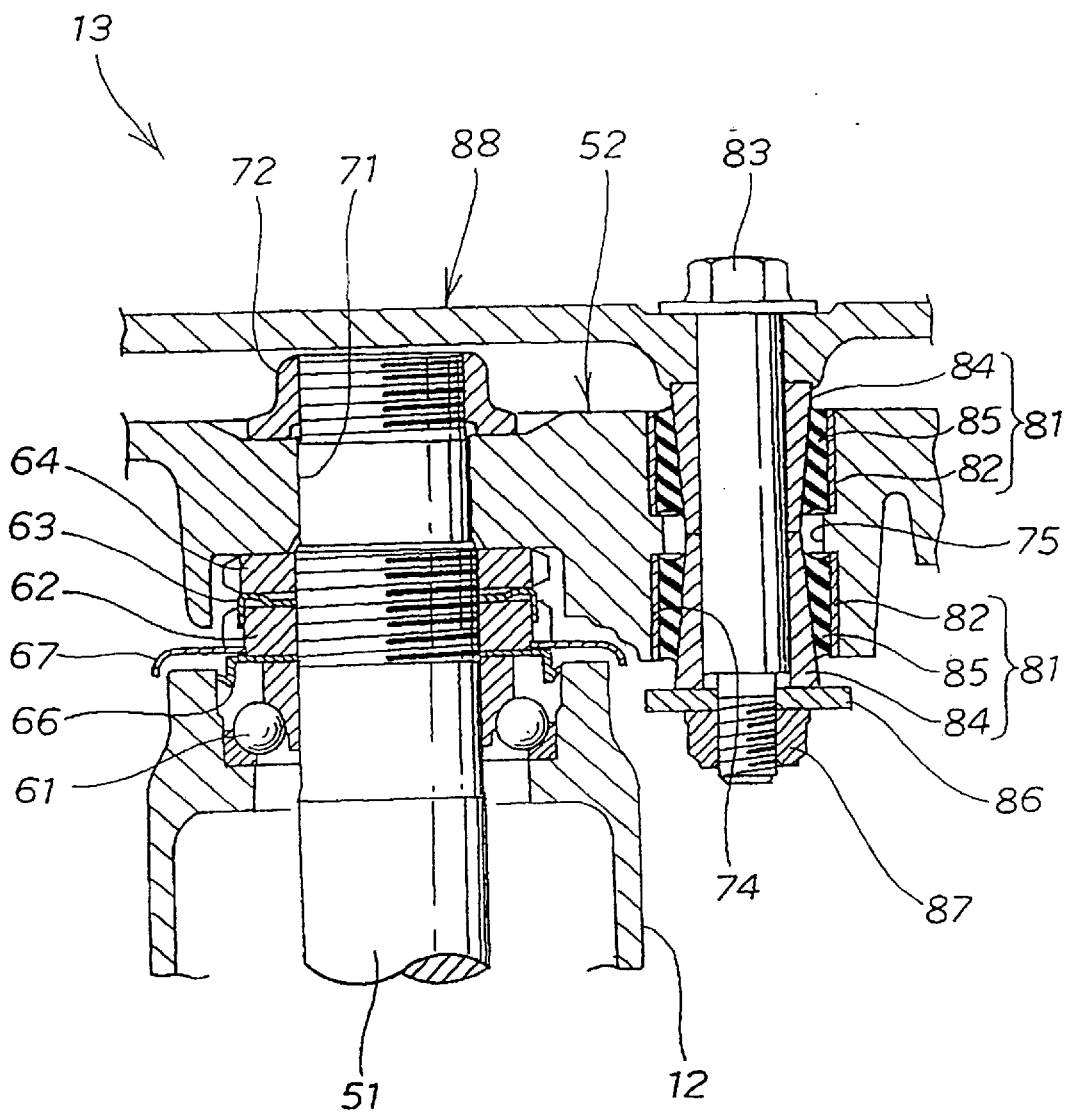
FIG. 5 is an enlarged sectional view showing a major portion of the steering system according to an embodiment of the present invention.

FIG. 5 is an enlarged sectional view of a portion of the steering system according to the embodiment of the present invention. The steering system 51 is supported on the head pipe 12 through an upper bearing 61, the axial movement of the steering stem 51 is restricted by means of a nut 62 installed in the steering stem 51, and further locked by means of a lock washer 63 and a lock nut 64.

The top bridge 52 has a mounting structure such that the upper end of the steering stem 51, projecting upward from the lock nut 64, fits in a mounting hole 71 of the top bridge 52, and the lock nut 64 and the nut 72 are mounted to attach the top bridge 52 to the upper end of the steering stem 51.

In the mounting structure of the handlebar bracket 88, a cushioning member mounting hole 74 is formed vertically through in the top bridge 52; a stepped portion 75 is formed in the midpoint of the lengthwise direction of the cushioning member mounting hole 74; two upper and lower cushioning members 81 are fitted in the openings in both ends of the cushioning member mounting hole 74; and the handlebar bracket 88 is mounted to the top bridge 52 through the two cushioning members 81 by means of the bolt 83 installed through the cushioning members 81.

Each cushioning member 81 is comprised of an outer tube 82 inserted in the cushioning member mounting hole 74, an inner tube 84 in which the bolt 83 is inserted, and a cushioning portion 85 interposed and secured by brazing between the outer and inner tubes 82 and 84.

The outer tube 82 is fitted in the cushioning member mounting hole 74 until one end face thereof contacts the stepped portion 75. The inner tube 84 has a tapered outer peripheral surface. The pair of upper and lower cushioning members 81 are so arranged that the tapered end surfaces of the inner tubes 84 face each other. The cushioning portion 85 is a cushioning member (an elastic bushing) which absorbs vibration, for example a rubber product.

With the handlebar bracket 88 mounted on the end face of one of the inner tubes 84 and with a washer 86 mounted on the end of the other inner tube 84, the bolt 83 and a nut 87 are tightened to thereby enable quite easy and proper adjustment of the vibration absorption characteristic of the cushioning portions 85. In the drawing, numeral 66 denotes a dust seal, and 67, a dust cover.

Figure 6:
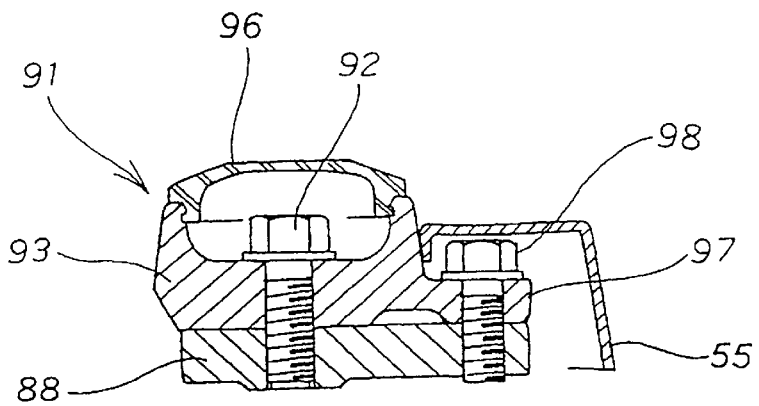
FIG. 6 is a sectional view taken along line 6—6 of FIG. 3.
Figure 7:
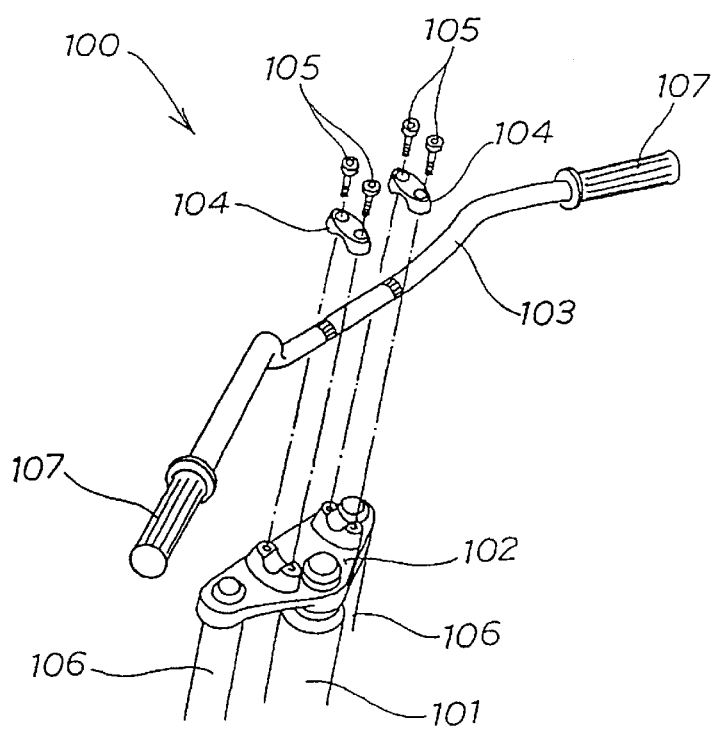
FIG. 7 is a schematic view of a conventional steering system of a motorcycle.

FIG. 6 is a sectional view taken along line 6—6 of FIG. 3, in which the handlebar base 93 is provided with a leg portion 97 which extends along the handlebar bracket 88. The leg portion 97 is fastened by a bolt 98 to the handlebar bracket 88, thereby locking the handlebar 91 from turning.

To continue explanation by referring back to FIG. 3, the handlebar bracket 88 is a large member extended to cover nearly the entire upper surface of the top bridge 52. It is possible therefore to cover, by the handlebar bracket 88, the cushioning members 81 (see FIG. 4) attached to the top bridge 52. The cushioning members 81 are invisible to the driver; and therefore the handlebar and its vicinity look cleanly arranged, thereby improving the appearance of the motorcycle itself.

Next, operation of the steering system 13 having the above-described configuration will be explained with reference to FIG. 4.

The handlebar bracket 88 is attached to the top bridge 52 through the cushioning members 81 being connected in a floating state (by floating connection) to the top bridge 52. The cushioning members 81 absorb vehicle body vibrations transmitted from the top bridge 52 to the handlebar bracket 88, thereby damping the vibrations being transmitted to the handlebars 91, which are attached on the handlebar bracket 88. Therefore, it is possible to improve the vibration-proof effect of the steering system 13, giving the driver a better steering feeling for pleasant driving.

When the right and left handlebars 91 are attached directly to the top bridge 52 through the cushioning members 81, the right and left cushioning members 81 function independently to absorb the vibrations.

On the other hand, when a single handlebar bracket 88 having relatively great rigidity is supported by the right and left cushioning members 81 and the right and left handlebars 91 are attached to the handlebar bracket 88, the right and left cushioning members 81 work together to perform vibration absorption. The right and left cushioning members 81 making such a compound operation further improve the vibration-proof effect of the steering system 13.

The improved vibration-proof effect of the steering system 13 is achieved by lowering the natural frequency of vibration either by decreasing the spring constant of the cushioning members 81 or by increasing the load acting on the cushioning members 81. When the spring constant of the cushioning members 81 is constant, increasing the load acting on the cushioning members 81 can lower the natural frequency of vibration. In the present invention, the use of the handlebar bracket of the relatively great weight increases at least the load acting on the upper cushioning members 81. As a result, the natural frequency is lowered, thereby further improving the vibration-proof effect of the steering system 13.

Although the handlebars 91 are attached to the top bridge 52 through the cushioning members 81, it is sufficient only to bolt the right and left handlebars 91 to the upper surface of the handlebar bracket 88. Therefore, even conventional handlebars can be mounted without making any change in the design of the present invention.

In the embodiment of the steering system according to this invention, the cushioning members 81 may be simply the cushioning portion 85 without the outer and inner tubes 82 and 84. Moreover, the present invention may be implemented with one contiguous cushioning member, as opposed two separate parts as shown in the Figures.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering system for a vehicle, comprising:
   a steering stem rotatably mounted on a frame portion of the vehicle;
   a bridge member mounted on a substantially distal end of said steering stem;
   a flat plate member attached to and over said bridge member,
      wherein said flat plate member covers substantially an upper surface area of said bridge member, and is attached to said bridge member via at least one bolt passed through at least one through hole in said flat plate member and through at least one passage in said bridge member, said at least one bolt being fixed in place by a nut threaded onto an end thereof, said at least one through passage having a cushioning member disposed therein.

2. The steering system according to claim 1, further comprising a cover positioned over said flat plate member.

3. The steering system according to claim 1, wherein a plurality of gaps are formed between said flat plate and said bridge member when said flat plate is in its attached state.

4. The steering system according to claim 1, wherein said at least one bolt is a plurality of bolts, said at least one through hole is a plurality of through holes, and said at least one passage is a plurality of passages, each one of said plurality of bolts passes through one of said plurality of through holes, respectively, and further through one of said plurality of passages, respectively, each one of said plurality of bolts being fixed in place by a nut threaded onto an end thereof.

5. The steering system according to claim 1, wherein said cushioning member is comprised of a first cushioning member and a second cushioning member.

6. The steering system according to claim 1, wherein said at least one passage has disposed thereon a stepped portion formed substantially at a midpoint of a lengthwise direction of said at least one passage.

7. The steering system according to claim 6, wherein said cushioning member is comprised of a first cushioning member and a second cushioning member, said first cushioning member is fitted into said passage via a distal end thereof and said second cushioning member is fitted into said passage via another distal end thereof, said first and second cushioning members each abutting said stepped portion along a surface thereof.

8. The steering system according to claim 7, wherein each of said first and second cushioning members comprise an outer tube being in contact with an interior wall of said passage, an inner tube being in contact with said at least one bolt, and a cushion portion interposed between said outer tube and said inner tube.

9. The steering system according to claim 8, wherein each inner tube has a tapered outer peripheral surface.

10. The steering system according to claim 8, wherein said nut fixes said at least one bolt via a washer positioned between one of said first and second cushioning members.

* * * * *